(12) United States Patent
Kresl et al.

(10) Patent No.: US 9,454,243 B2
(45) Date of Patent: Sep. 27, 2016

(54) VIRTUAL OPTICAL TOUCH SCREEN DETECTING TOUCH DISTANCE

(71) Applicant: Iconics, Inc., Foxborough, MA (US)

(72) Inventors: Vojta Kresl, Plzen (CZ); Christopher N. Elsbree, Milford, MA (US); Russell L. Agrusa, Westwood, MA (US); Paulo G. De Barros, Franklin, MA (US); Petr Altman, Plzen (CZ)

(73) Assignee: Iconics, Inc., Foxborough, MA (US)

( * ) Notice: Subject to any disclaimer, the term of this patent is extended or adjusted under 35 U.S.C. 154(b) by 99 days.

(21) Appl. No.: 14/251,059

(22) Filed: Apr. 11, 2014

(65) Prior Publication Data

US 2014/0306889 A1 Oct. 16, 2014

Related U.S. Application Data

(60) Provisional application No. 61/811,368, filed on Apr. 12, 2013.

(51) Int. Cl.
*G06F 3/033* (2013.01)
*G06F 3/042* (2006.01)

(52) U.S. Cl.
CPC .............. *G06F 3/033* (2013.01); *G06F 3/042* (2013.01); *G06F 3/0425* (2013.01)

(58) Field of Classification Search
CPC ...... G06F 3/033; G06F 3/042; G06F 3/0428; G06F 21/84; G06F 3/0421; G06F 3/0423; G09G 5/00
See application file for complete search history.

(56) References Cited

U.S. PATENT DOCUMENTS

| 2010/0188428 | A1 | 7/2010 | Shin et al. |
| 2012/0188206 | A1* | 7/2012 | Sparf ............... G06F 3/042 345/175 |
| 2012/0326995 | A1 | 12/2012 | Zhang et al. |

OTHER PUBLICATIONS

International Search Report and Written Opinion for International Application No. PCT/US2014/033825, mailed Jul. 18, 2014, 10 pages.

* cited by examiner

*Primary Examiner* — Larry Sternbane
*Assistant Examiner* — Sepehr Azari
(74) *Attorney, Agent, or Firm* — Goodwin Procter LLP

(57) ABSTRACT

Apparatus and methods are provided for converting a display into a touch display. One or more optical sensors are arranged proximate the display. A processor receives a signal from the optical sensor(s) and, based on the signal, executes instructions for: (i) determining a distance between a pointer device and a surface of the display signal; (ii) determining a position of the pointer device on the surface of the display; (iii) when the distance is less than a threshold detection distance and greater than a threshold touch distance, providing an indication on the display that the position of the pointer device has been determined; and (iv) when the distance is less than the threshold touch distance, taking an action indicative of contact between the pointer device and the surface of the display.

24 Claims, 8 Drawing Sheets

VIRTUAL OPTICAL TOUCH SCREEN DETECTING TOUCH DISTANCE

CROSS-REFERENCE TO RELATED APPLICATION

This application claims priority to and the benefit of, and incorporates herein by reference in its entirety, U.S. Provisional Patent Application No. 61/811,368, entitled "Virtual Touch Screen," which was filed on Apr. 12, 2013.

FIELD OF THE INVENTION

Embodiments of the invention relate generally to displays and, more particularly, to apparatus and methods for converting a display into a touch display.

BACKGROUND

Graphical displays may be categorized as being either touch displays or non-touch displays. With touch displays, a user may provide input to an associated processor or computing device by contacting the display (e.g., with a finger) to select or manipulate an item on the display. With non-touch displays, a user is unable to interact directly with the display and must provide input to the associated processor using a separate input device, such as a mouse or keyboard. Wireless motion sensors allow users to interact with displays via skeletal sensing and other means, but require the user to be a certain distance (e.g., more than 3 meters) away from the display.

There is a need for apparatus and methods that allow a non-touch display to be converted into a touch display and that allow the user to operate in close proximity to the display.

SUMMARY OF THE INVENTION

Embodiments of the apparatus and method described herein utilize one or more optical sensors to allow a non-touch display to behave like a touch display. In particular, an optical sensor may be used to detect the position of a user's finger or other pointer device with respect to the display. When the user moves the finger to within a threshold detection distance (e.g., 1 to 3 inches, or less than about 6 inches) of the display, the display may provide an indication that the position of the finger has been detected. For example, an item (e.g., a button) that the user could select may become brighter to let the user know that the item is available for selection. When the user moves the finger closer to the display, such that the finger is within a threshold touch distance (e.g., less than about 1 inch) of the display, the apparatus may take an action that is consistent with direct contact between the finger and the surface of the display. For example, the action may indicate that an item has been selected by the user. Alternatively or additionally, the action may indicate that the user is manipulating or modifying an image on the display, such as translating or expanding the image, or drawing lines or other features in the image.

Advantageously, the apparatus and methods described herein allow any non-touch display to be converted into or used as a touch display. Suitable non-touch displays that may be used with the apparatus and methods include, for example, flat screen televisions, projections on a screen or wall from a projector, and computer monitors.

In one aspect, the invention relates to an apparatus for converting a display into a touch display. The apparatus includes at least one optical sensor arranged proximate the display and having at least one depth sensor. The apparatus also includes a processor configured to receive a signal from the at least one optical sensor. The processor is configured to execute instructions for: (i) determining a distance between at least one pointer device (e.g., one or more fingers of a user) and a surface of the display, based on the signal; (ii) determining a position of the at least one pointer device on the surface of the display, based on the signal; (iii) when the distance is less than a threshold detection distance (e.g., less than about 6 inches) and greater than a threshold touch distance (e.g., less than about 1 inch), providing an indication on the display that the position of the at least one pointer device has been determined; and (iv) when the distance is less than the threshold touch distance, taking an action indicative of contact between the at least one pointer device and the surface of the display.

In certain embodiments, the at least one optical sensor is oriented in a direction that is substantially parallel to the surface of the display. The at least one optical sensor may also include at least one camera, and/or the at least one depth sensor may include a laser projector. In some embodiments, the at least one optical sensor includes a first optical sensor oriented in a first direction, and a second optical sensor oriented in a second direction, such that the first direction is substantially orthogonal to the second direction, and the first and second directions are substantially parallel to the surface of the display. The at least one optical sensor may also include a third optical sensor oriented in a third direction, and a fourth optical sensor oriented in a fourth direction, such that the third direction is substantially orthogonal to the fourth direction, and the third and fourth directions are substantially parallel to the surface of the display.

In certain embodiments, the at least one pointer device includes two or more pointer devices, and the processor is configured to determine a position of each pointer device on the surface of the display. In some embodiments, determining a position includes determining a closest point to the at least one pointer device on the surface of the display. Providing an indication on the display may include adjusting an image on the display in the vicinity of the position of the at least one pointer device on the surface of the display. Taking an action indicative of contact between the at least one pointer device and the surface of the display may include, for example, translating an image, expanding an image, shrinking an image, selecting an item or object, and/or rotating a virtual object.

In another aspect, the invention relates to a method of converting a display into a touch display. The method includes: receiving a signal from at least one optical sensor arranged proximate the display and having at least one depth sensor; determining a distance between at least one pointer device (e.g., one or more fingers of a user) and a surface of the display, based on the signal; determining a position of the at least one pointer device on the surface of the display, based on the signal; when the distance is less than a threshold detection distance (e.g., less than about 6 inches) and greater than a threshold touch distance (e.g., less than about 1 inch), providing an indication on the display that the position of the at least one pointer device has been determined; and when the distance is less than the threshold touch distance, taking an action indicative of contact between the at least one pointer device and the surface of the display.

In certain embodiments, the at least one optical sensor is oriented in a direction that is parallel or substantially parallel to the surface of the display. The at least one optical sensor may include at least one camera, and/or the at least one depth sensor may include a laser projector. In some embodiments, the at least one optical sensor includes a first optical sensor oriented in a first direction, and a second optical sensor oriented in a second direction, such that the first direction is substantially orthogonal to the second direction, and the first and second directions are substantially parallel to the surface of the display. The at least one optical sensor may also include a third optical sensor oriented in a third direction, and a fourth optical sensor oriented in a fourth direction, such that the third direction is substantially orthogonal to the fourth direction, and the third and fourth directions are substantially parallel to the surface of the display.

In certain embodiments, the at least one pointer device includes two or more pointer devices, and determining a position of the least one pointer device includes determining a position of each pointer device on the surface of the display. Determining a position may include determining a closest point to the at least one pointer device on the surface of the display. Providing an indication on the display may include adjusting an image on the display in the vicinity of the position of the at least one pointer device on the surface of the display. In some embodiments, taking an action indicative of contact between the at least one pointer device and the surface of the display includes selecting an item, translating an image, expanding an image, shrinking an image, selecting an item or object, and/or rotating a virtual object.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

While the invention is particularly shown and described herein with reference to specific examples and specific embodiments, it should be understood by those skilled in the art that various changes in form and detail may be made therein without departing from the spirit and scope of the invention.

DETAILED DESCRIPTION

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

Throughout the description, where devices and systems are described as having, including, or comprising specific components, or where processes and methods are described as having, including, or comprising specific steps, it is contemplated that, additionally, there are devices and systems of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

Figure 1:
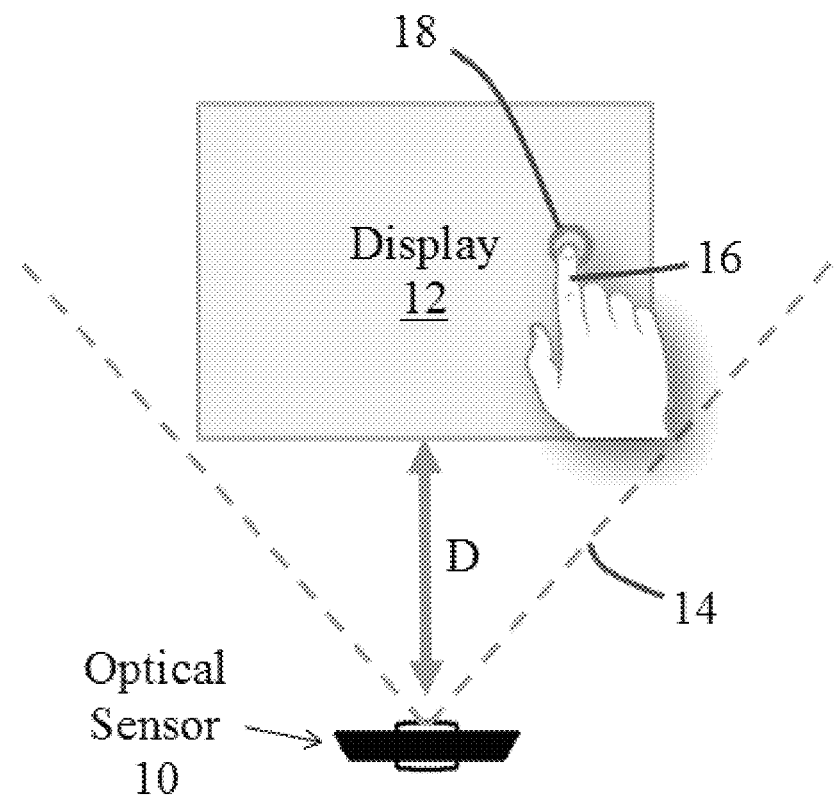
FIG. 1 is a schematic front view of an optical sensor positioned near a display, according to an illustrative embodiment of the invention.

Referring to FIG. 1, in various embodiments, apparatus and methods are provided that use an optical sensor 10 to convert a non-touch display into a touch display. The optical sensor 10 is positioned proximate a display 12 and oriented in a direction that is substantially parallel to a surface of the display. For example, the optical sensor 10 may be positioned a distance D of about 1 meter below a bottom edge of the display 12. A field of view 14 of the optical sensor is preferably wide enough to encompass the entire display 12. The optical sensor 10 may include one or more depth sensors (e.g., laser projectors) that allow a position of a user's finger 16 or other pointing device to be determined relative to a surface of the display 12. For example, the depth sensor(s) may be used to determine a distance between the optical sensor 10 and the user's finger (e.g., along the surface of the display). The optical sensor 10 may also include one or more cameras for obtaining an image of the user's finger 16 near the display. In some embodiments, the optical sensor 10 is a KINECT™ device, available from MICROSOFT® of Redmond, Wash. Alternatively, the optical sensor 10 may be a PRIMESENSE OPENNI 3D sensor, available from PrimeSense, LTD.

The display may be any type of display capable of presenting an image. Suitable displays include, for example, computer monitors and televisions (e.g., flat screen HD televisions). In some embodiments, the display is a wall, a floor, a screen, a table, a desk, or other surface displaying an image projected from behind or in front of the surface using, for example, a video projector. The display surface is preferably smooth and flat, although rough, curved, and/or textured surfaces may also be used.

In various embodiments, the apparatus and methods described herein use data from the optical sensor 10 to determine a position of the user's finger 16 with respect to the display 12 while allowing the user to be positioned in close proximity to the display 12 and interact directly with the display 12. For example, the apparatus and methods may determine when the user's finger 16 is within a threshold detection distance from a surface of the display 12. The threshold detection distance may be, for example, less than about 12 inches, less than about 6 inches, less than about 3 inches, or less than about 1.5 inches. When the user's finger 16 is within the threshold detection distance from the display, the apparatus and methods may use the optical sensor 10 to determine a position on the display 12 that corresponds to the user's finger 16. The position may be a point on the surface of the display 12 that is closest to the user's finger 16 and/or corresponds to a projection of the user's finger 16 onto the surface of the display 12. Once the position of the finger 16 has been identified, the apparatus and methods may provide an indication on the display 12 that the position of the finger 16 has been determined. For example, a cursor may appear at the position of the finger 16. Alternatively, a button in the vicinity of the user's finger 16 may become highlighted to inform the user that the button is available for selection. In one embodiment, the apparatus and methods provide a circle 18 or other icon (e.g., a cursor avatar) on the display 12 around the position of the user's finger 16, when the finger 16 is hovering in front of the display 12. A diameter or area of the circle 18 (or size of the cursor avatar) may be proportional or otherwise related to the distance between the finger 16 and the display 12, such that the circle 18 may decrease in size as the finger 16 approaches the display 12. In some implementations, an icon other than a circle is displayed at the position of the user's finger (e.g., a square icon, an arrow icon, or a finger icon), and a size of the icon is a function of the distance between the user's finger 16 and the display 12.

In some embodiments, the apparatus and methods use the optical sensor 10 to allow a user to select or manipulate displayed items through contact with the display 12. In such instances, the apparatus and methods may determine when the user's finger 16 or other pointer device is within a threshold touch distance of the display 12. In such an instance, the apparatus may consider the finger 16 to be in contact with the display, and identify a position on the surface of the display 12 corresponding to the contact. The apparatus and methods may then respond to the finger 16 like any touch screen would respond. For example, if the user contacts or taps a displayed button, the apparatus and methods may execute a task associated with the selection of the button. Likewise, when the user drags the finger 16 along the surface, within the threshold touch distance, displayed images may be translated, rotated, expanded, or reduced in size, as desired. In one example, the user may zoom in or out of an image (e.g., a 3D model) by contacting the display with two fingers and moving the fingers further apart or closer together, respectively. Contact and movement with a single finger may cause the image to rotate. In general, the apparatus and methods are capable of recognizing and responding to any contact or movement (e.g., tapping, dragging, selecting, spinning, and/or any other gesture) provided by the user. The threshold touch distance may be, for example, less than about 1 inch, less than about 0.5 inches, or less than about 0.25 inches.

Figure 2:
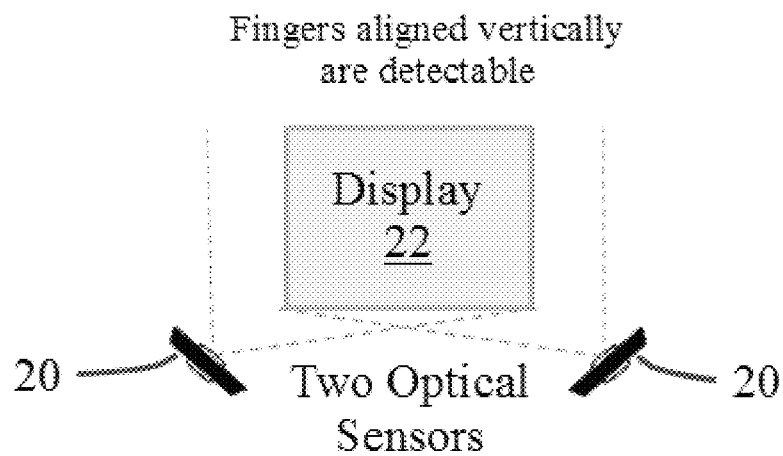
FIG. 2 is a schematic front view of two optical sensors positioned near adjacent corners of a display, according to an illustrative embodiment of the invention.

In certain implementations, a single optical sensor may have difficulty detecting the position of a finger or other pointer device on or near the display. For example, if the user places one finger behind another finger along a detection path of the sensor, a single optical sensor may have difficulty detecting the obscured finger. Likewise, with displays that are large (e.g., greater than 40 inches, measured diagonally), a single optical sensor may have difficulty accurately detecting the position of the finger over the entire surface of the display. In such instances, it may be desirable to provide more than one optical sensor for the display. For example, referring to FIG. 2, two optical sensors 20 may be positioned near adjacent corners of a display 22. In one embodiment, the two optical sensors 20 are oriented in directions that are substantially orthogonal to one another. With this two-sensor configuration, when one optical sensor is unable to detect an obscured finger, the other optical sensor is generally able to detect the finger.

Figure 3:
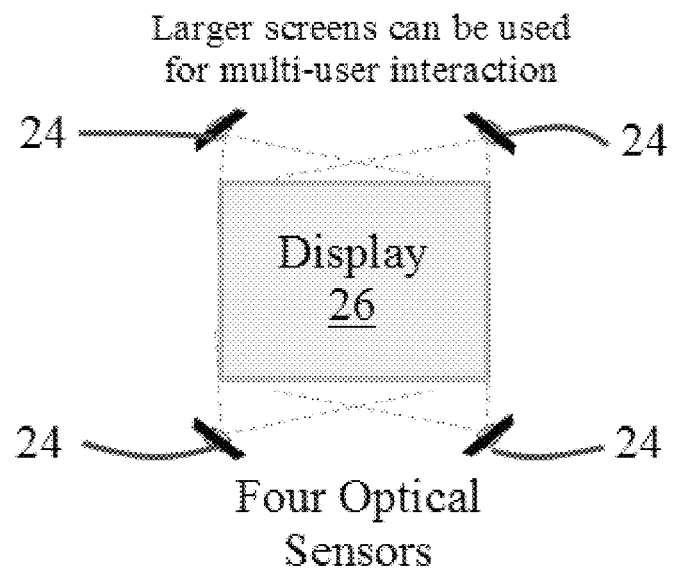
FIG. 3 is a schematic front view of four optical sensors, each positioned near a corner of a display, according to an illustrative embodiment of the invention.

Referring to FIG. 3, some embodiments of the invention may utilize four optical sensors 24, with each optical sensor 24 positioned near a corner of a display 26. This four-sensor configuration may be appropriate for large displays (e.g., greater than 40 inches, greater than 60 inches, or greater than 80 inches) and/or when more than one user is interacting with the display. The use of multiple optical sensors allows one sensor to detect a finger that is obscured in the view of another sensor or that is too far from another sensor to detect accurately. The systems and methods described herein may utilize, for example, 1, 2, 4, 6, 8, or more optical sensors per display.

Figure 4:
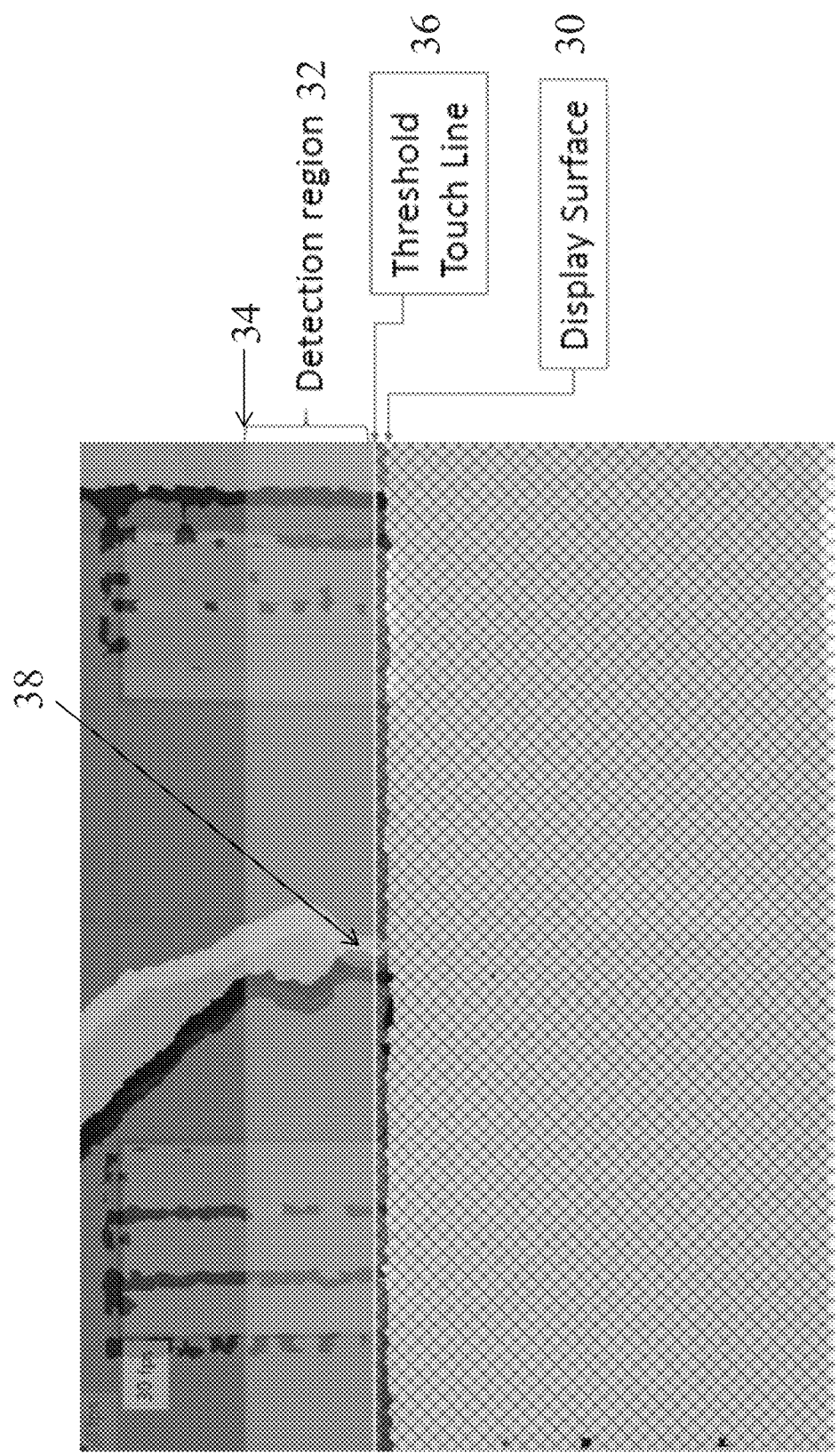
FIG. 4 is an image obtained from an optical sensor positioned beneath a display, showing a user's finger in close proximity to the display, according to an illustrative embodiment of the invention.

Referring to FIG. 4, in certain examples, an optical sensor includes a camera that may be used to position the optical sensor with respect to a display surface 30. For example, the camera may be used to establish or define a detection region 32 that lies within a threshold detection distance 34 from the display surface 30. The user may also use the camera to establish or define a threshold touch line 36 corresponding to the threshold touch distance, within which a user's finger 38 is deemed to be touching or contacting surface 30 of the display. Given measurement accuracies and/or geometric constraints, it may be difficult for the optical sensor to determine when the finger 38 is in actual contact with the surface of the display. Use of the threshold touch distance allows a close proximity between the finger 38 and the surface 30 of the display to count as actual contact.

Figure 5:
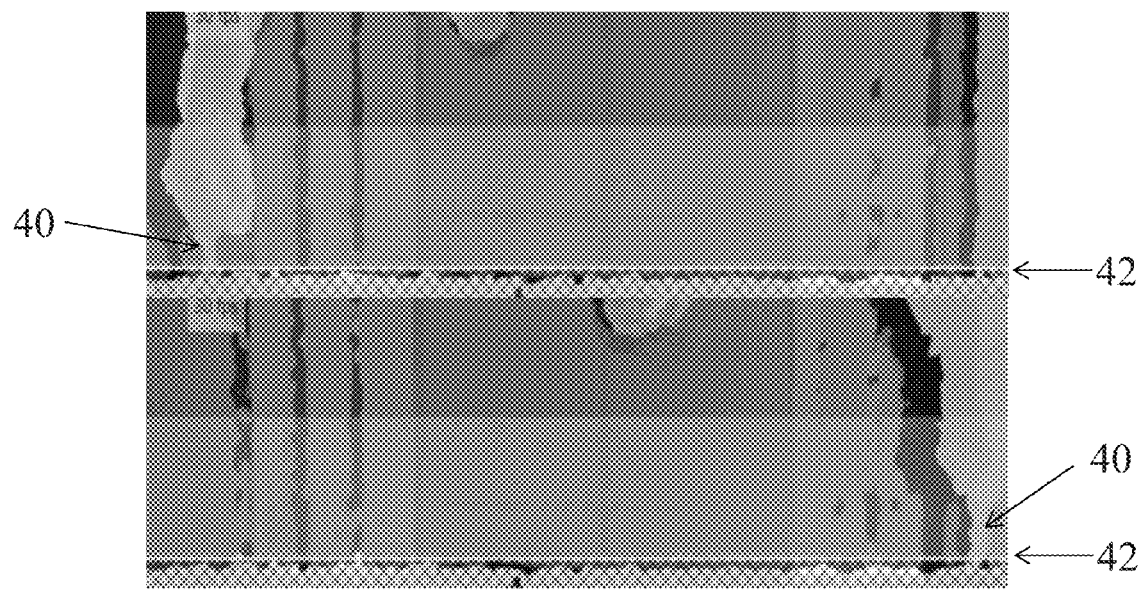
FIG. 5 includes two stacked images obtained from an optical sensor positioned beneath a display, showing a user's finger in close proximity with corners of a display, according to an illustrative embodiment of the invention.
Figure 6:
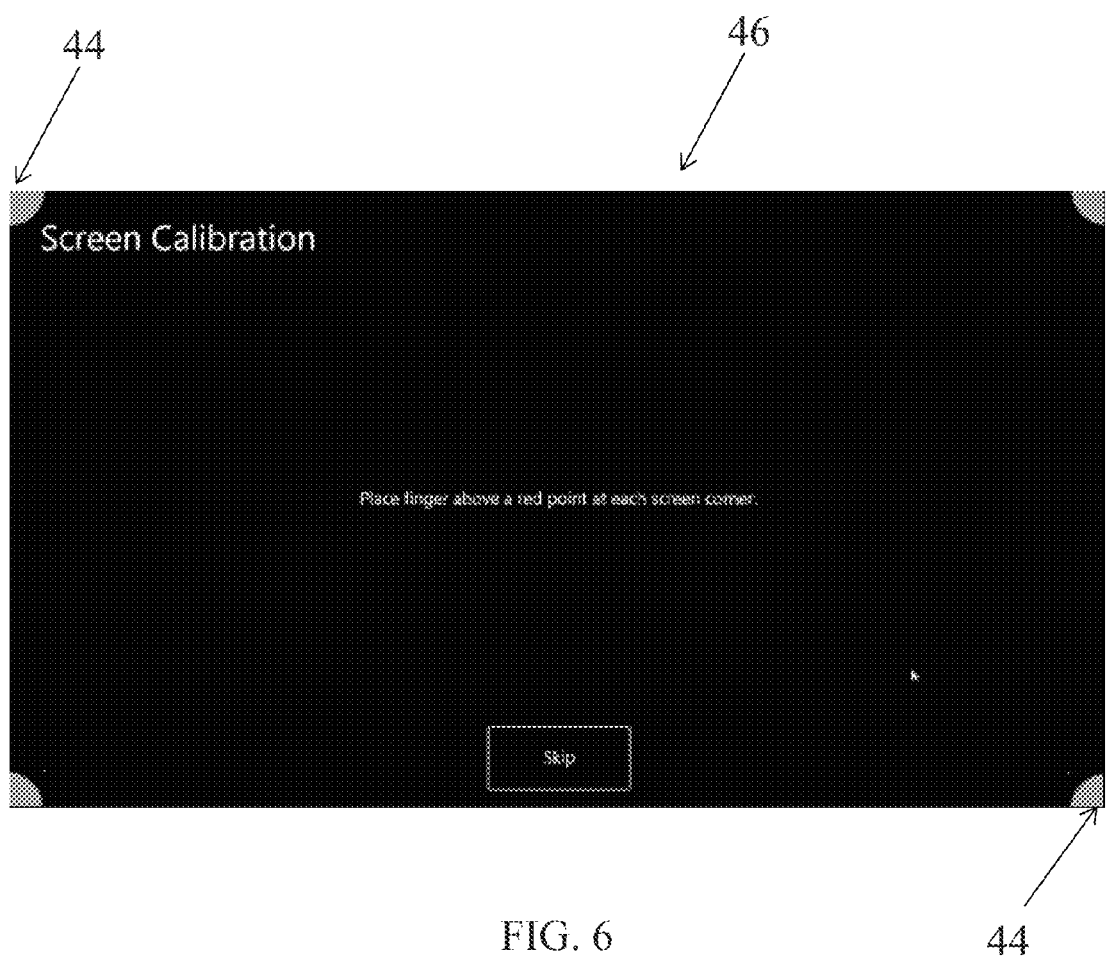
FIGS. 6 and 7 are screenshots of a calibration utility used to configure an optical sensor with respect to a display, according to an illustrative embodiment of the invention.
Figure 7:
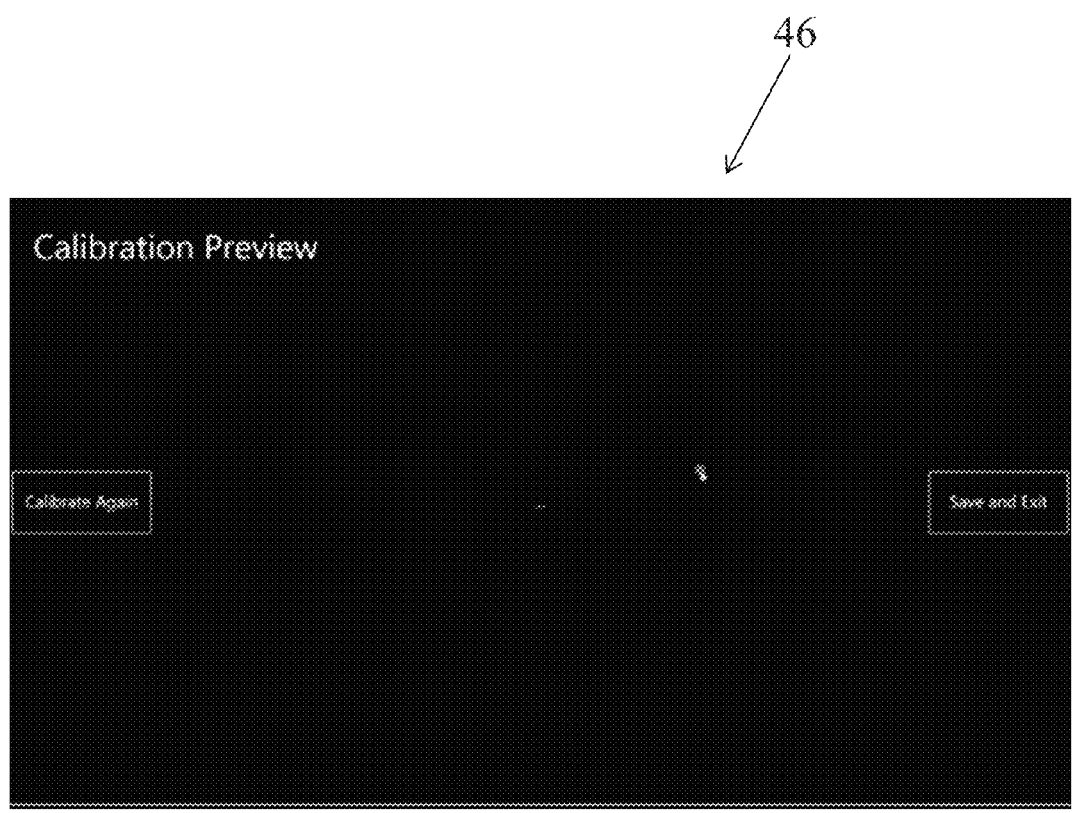

Referring to FIGS. 5-7, in certain embodiments, a calibration procedure is utilized to ensure that an optical sensor is able to detect the location of a user's finger 40 in front of an entire surface of a display 42. The calibration procedure may include placing the finger 40 in front of two or more corners of the display 42. When the finger 40 is in front of a corner 44 of the display, a calibration utility 46 (e.g., a software program) may be used to identify the particular corner where the finger 40 is located. In one embodiment, the calibration utility 46 provides one or more targets (e.g., a sequence of circles) on the display that the user contacts with the finger 40.

In certain embodiments, the apparatus and methods utilize a skeletal tracking mode in which the user stands several feet (e.g., 3 to 15 feet) in front of a display and performs gestures to interact with the display. With the skeletal tracking mode, one or more optical sensors may be facing away from the display, towards the user, such that the apparatus recognizes the user's skeletal features (e.g., hands, arms, and face) and responds according to movement of those features. For example, when the user raises a hand and faces a palm of the hand toward the display, the apparatus may provide an indication of the user's hand position (e.g., a cursor) on the display. The user can then move the hand to a position corresponding to a desired location on the display. The user may interact further with the display by opening or closing one or more fingers on the hand. For example, the user may select an item (e.g., a menu option or a button) on the display by quickly closing and opening the fingers (e.g., a quick pinch). The user may manipulate an item (e.g., translate a 2D image or rotate a 3D virtual object) on the display by forming a first with the hand (e.g., to grab the item) and moving the first according to the desired manipulation of the item. In one embodiment, the user may manipulate a 3D virtual object by forming two fists and moving the fists together, as a rigid body. To zoom in or out of the 3D virtual model, the user can move the two fists further apart or closer together, respectively.

The skeletal mode may also be used to facilitate the reception and/or interpretation of voice commands from the user. For example, when the user performs a designated hand gesture, such as moving the hand near the user's mouth, the apparatus may recognize that the user is about to issue a voice command. The display may provide an indication (e.g., a message that says the apparatus is listening) that the apparatus is ready to receive the voice command. Upon receipt of the voice command, the apparatus may take an action associated with the command.

The skeletal mode may also be used to provide messages to the user regarding the position of the user's body. For example, the apparatus may provide a message to inform the user that the user's body and/or head are not facing the display. Such messages may help the user obtain the proper body position and/or let the user know when the user's body is not being detected.

Figure 8:
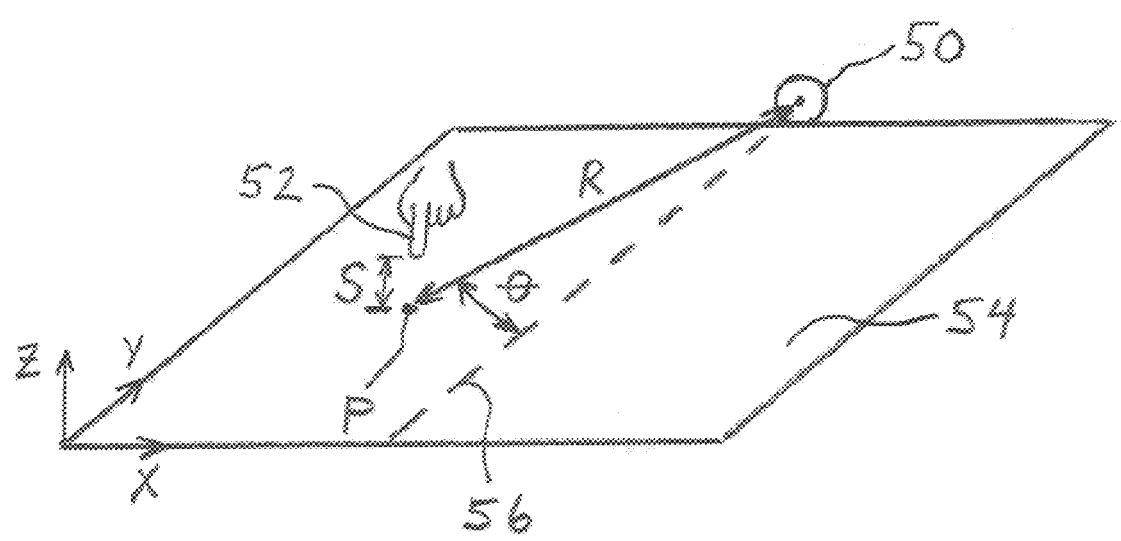
FIG. 8 is a schematic diagram of an optical sensor used to determine a position of a user's finger relative to a display, according to an illustrative embodiment of the invention.

In various embodiments, the optical sensors described herein are used to determine (i) a distance between a user's finger (or other pointer device) and a display, and (ii) a position of the user's finger on or in front of the display. Referring to FIG. 8, an optical sensor 50 may measure a separation distance S, a radial distance R, and an angular position θ of a user's finger 52 relative to a display 54. The separation distance S is a distance between a tip of the user's finger 52 and a closest point P on the surface of the display 54 (e.g., in a direction normal to the display 54). The radial distance R is a distance between the optical sensor 50 and the closest point P. The radial distance R may be measured, for example, using a depth sensor incorporated into the optical sensor 50. The angular position θ is an angle between (i) a centerline 56 or center axis of the optical sensor 50 along the display 54, and (ii) a line between the optical sensor 50 and closest point P along the display 54. The separation distance S and the angular position θ may be measured, for example, using a camera incorporated into the optical sensor 50. A scale factor may be used to adjust the measured separation distance S to account for the radial distance R between the user's finger 52 and the optical sensor 50. For example, when the user's finger 52 is far from the optical sensor 50, the separation distance S may be larger than it appears from the perspective of a camera within the optical sensor 50. In such an instance, the separation distance S may be increased according to the radial distance R, using the scale factor.

In some implementations, the radial distance R, the angular position θ, and the separation distance S are coordinates in a polar coordinate system, with the optical sensor 50 located at the origin of the polar coordinate system. The polar coordinates may be transformed to Cartesian coordinates (i.e., x, y, z coordinates) for the display 54, using transformation techniques known by those of ordinary skill in the art.

Figure 9:
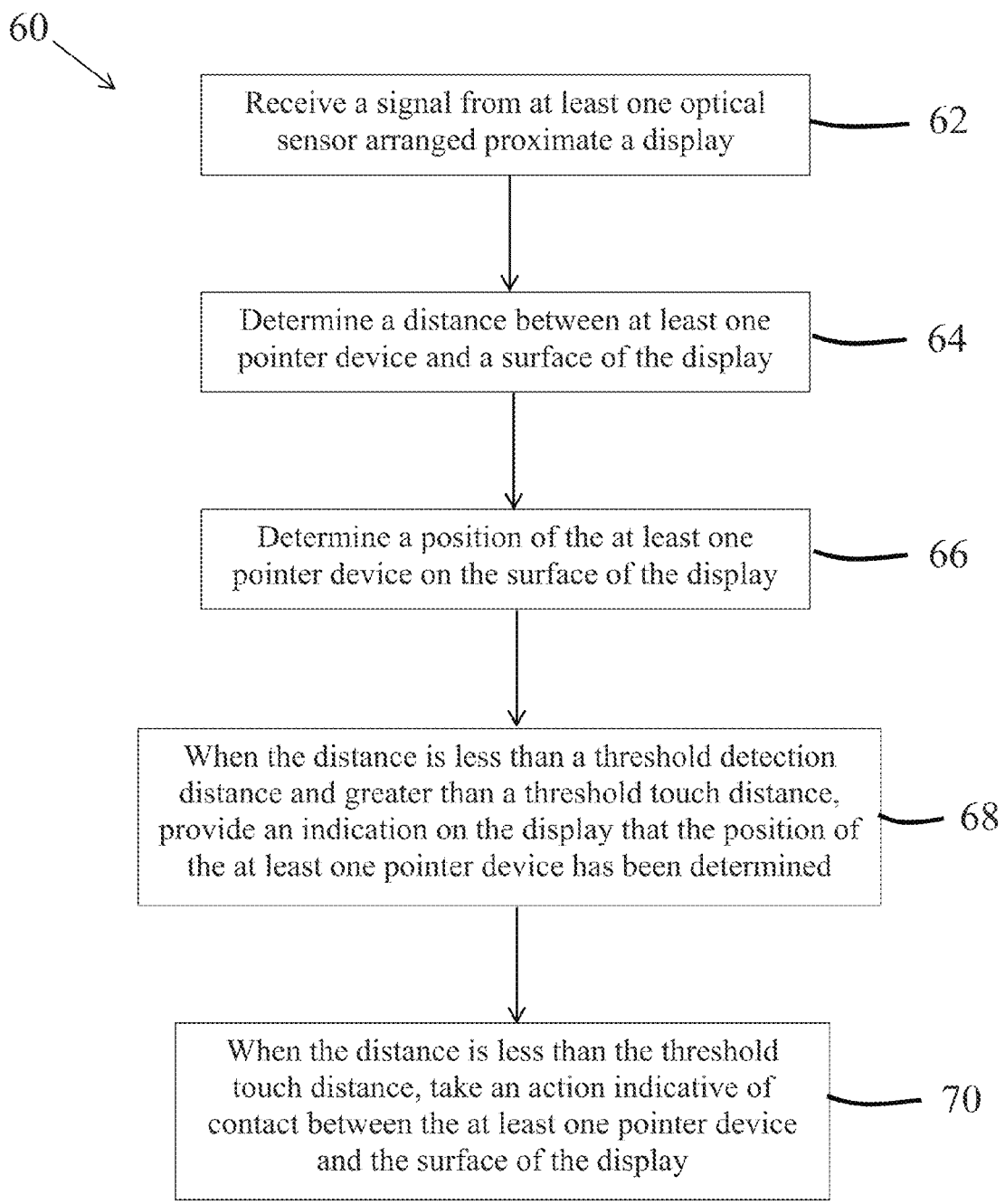
FIG. 9 is a flowchart of a method for converting a display into a touch display, according to an illustrative embodiment of the invention

Referring to FIG. 9, in certain embodiments, a method 60 is provided for converting a display into a touch display. At step 62, a signal is received from at least one optical sensor arranged proximate the display and having at least one depth sensor. The signal is used to determine (step 64) a distance between a pointer device and a surface of the display (e.g., the separation distance S). The signal is also used to determine (step 66) a position of the pointer device on (or adjacent to) the surface of the display (e.g., the radial distance R and the angular position θ). When the distance is less than a threshold detection distance and greater than a threshold touch distance, an indication may be provided (step 68) on the display that the position of the pointer device has been determined. For example, a circle or other icon may be displayed at the pointer device position on the display. When the distance is less than the threshold touch distance, an action is taken (step 70) that is indicative of contact between the pointer device and the surface of the display. In some instances, step 68 is omitted from the method 60, such that no indication of the position may be provided on the display until the distance is less than the threshold touch distance.

Embodiments of the apparatus and methods described herein may utilize a computer system, which may include a general purpose computing device in the form of a computer including a processor or processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between components, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Mac OS operating system, Google Android operating system, Apple iOS operating system, or another operating system or platform.

At a minimum, the memory includes at least one set of instructions that is either permanently or temporarily stored. The processor executes the instructions that are stored in order to process data. The set of instructions may include various instructions that perform a particular task or tasks. Such a set of instructions for performing a particular task may be characterized as a program, software program, software, engine, module, component, mechanism, or tool.

The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Basic, C, C++, C#, CSS, HTML, Java, SQL, Perl, Python, Ruby and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, Storage Area Networking devices, solid state drives, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the systems that embody the invention through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

The systems that embody the invention may communicate with the user via notifications sent over any protocol that can be transmitted over a packet-switched network or telecommunications network. By way of example, and not limitation, these may include SMS messages, email (SMTP) messages, instant messages (GChat, AIM, Jabber, etc.), social platform messages (Facebook posts and messages, Twitter direct messages, tweets, retweets, etc.), and mobile push notifications (iOS, Android).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Although internal components of the computer are not shown, those of ordinary skill in the art will appreciate that such components and the interconnections are well known. Accordingly, additional details concerning the internal construction of the computer need not be disclosed in connection with the present invention.

It is understood that the methods and systems described above may contain software and hardware connected to the Internet via a network. Computing devices are capable of communicating with each other via the Internet, and it should be appreciated that the various functionalities of the components may be implemented on any number of devices.

The invention may be practiced using any communications network capable of transmitting Internet protocols. A communications network generally connects a client with a server, and in the case of peer to peer communications, connects two peers. The communication may take place via any media such as standard telephone lines, LAN or WAN links (e.g., T1, T3, 56 kb, X.25), broadband connections (ISDN, Frame Relay, ATM), wireless links (802.11, Bluetooth, 3G, CDMA, etc.), and so on. The communications network may take any form, including but not limited to LAN, WAN, wireless (WiFi, WiMAX), near-field (RFID, Bluetooth). The communications network may use any underlying protocols that can transmit Internet protocols, including but not limited to Ethernet, ATM, VPNs (PPPoE, L2TP, etc.), and encryption (SSL, IPSec, etc.)

The invention may be practiced with any computer system configuration, including hand-held wireless devices such as mobile phones or personal digital assistants (PDAs), multiprocessor systems, microprocessor-based or programmable consumer electronics, minicomputers, mainframe computers, computers running under virtualization, etc.

The invention may also be practiced in distributed computing environments where tasks are performed by remote processing devices that are linked through a communications network. In a distributed computing environment, program modules may be located in both local and remote computer storage media including memory storage devices.

The invention's data store may be embodied using any computer data store, including but not limited to, relational databases, non-relational databases (NoSQL, etc.), flat files, in memory databases, and/or key value stores. Examples of such data stores include the MySQL Database Server or ORACLE Database Server offered by ORACLE Corp. of Redwood Shores, Calif., the PostgreSQL Database Server by the PostgreSQL Global Development Group of Berkeley, Calif., the DB2 Database Server offered by IBM, Mongo DB, Cassandra, or Redis.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. An apparatus for converting a display into a touch display, the apparatus comprising:
    at least one optical sensor arranged proximate the display and substantially within a plane defined by a surface of the display, the at least one optical sensor comprising at least one depth sensor and being oriented in a direction parallel to the surface of the display; and
    a processor configured to receive a signal from the at least one optical sensor, the processor configured to execute instructions for:
        (i) determining a first distance between at least one pointer device and a surface of the display, based on the signal;
        (ii) determining a position of the at least one pointer device on the surface of the display, based on the signal; and
        (iii) determining that the first distance is less than a threshold touch distance and, in response thereto, taking an action indicative of contact between the at least one pointer device and the surface of the display,
    wherein the at least one depth sensor comprises a laser projector configured to determine a second distance between the at least one optical sensor and the at least one pointer device, along the surface of the display.

2. The apparatus of claim 1, wherein the at least one optical sensor further comprises at least one camera.

3. The apparatus of claim 1, wherein the at least one optical sensor comprises a first optical sensor oriented in a first direction, and a second optical sensor oriented in a second direction, the first direction being substantially orthogonal to the second direction, the first and second directions being substantially parallel to the surface of the display.

4. The apparatus of claim 3, wherein the at least one optical sensor further comprises a third optical sensor oriented in a third direction, and a fourth optical sensor oriented in a fourth direction, the third direction being substantially orthogonal to the fourth direction, the third and fourth directions being substantially parallel to the surface of the display.

5. The apparatus of claim 1, wherein the at least one pointer device comprises two or more pointer devices, and the processor is configured to determine a position of each pointer device on the surface of the display.

6. The apparatus of claim 1, wherein the at least one pointer device comprises at least one finger of a user.

7. The apparatus of claim 1, wherein determining a position comprises determining a closest point to the at least one pointer device on the surface of the display.

8. The apparatus of claim 1, wherein the threshold touch distance is less than about 1 inch.

9. The apparatus of claim 1, wherein the processor is further configured to execute instructions for determining that the first distance is less than a threshold detection distance and greater than the threshold touch distance and, in response thereto, providing an indication on the display that the position of the at least one pointer device has been determined, the indication comprising adjusting an image on the display in a vicinity of the position of the at least one pointer device on the surface of the display.

10. The apparatus of claim 9, wherein the threshold detection distance is less than about 6 inches.

11. The apparatus of claim 1, wherein taking an action indicative of contact between the at least one pointer device and the surface of the display comprises an action selected from the group consisting of: selecting an item, translating an image, expanding an image, shrinking an image, and rotating a virtual object.

12. The apparatus of claim 1, wherein determining the first distance between the at least one pointer device and the surface of the display comprises calculating a scale factor based on the second distance between the at least one optical sensor and the at least one pointer device.

13. A method of converting a display into a touch display, the method comprising:
    receiving a signal from at least one optical sensor arranged proximate the display and substantially within a plane defined by a surface of the display, the at least one optical sensor comprising at least one depth sensor and being oriented in a direction parallel to the surface of the display;
    determining a first distance between at least one pointer device and a surface of the display, based on the signal;
    determining a position of the at least one pointer device on the surface of the display, based on the signal; and
    determining that the first distance is less than a threshold touch distance and, in response thereto, taking an action indicative of contact between the at least one pointer device and the surface of the display,
    wherein the at least one depth sensor comprises a laser projector configured to determine a second distance between the at least one optical sensor and the at least one pointer device, along the surface of the display.

14. The method of claim 13, wherein the at least one optical sensor further comprises at least one camera.

15. The method of claim 13, wherein the at least one optical sensor comprises a first optical sensor oriented in a first direction, and a second optical sensor oriented in a second direction, the first direction being substantially orthogonal to the second direction, the first and second directions being substantially parallel to the surface of the display.

16. The method of claim 15, wherein the at least one optical sensor further comprises a third optical sensor oriented in a third direction, and a fourth optical sensor oriented in a fourth direction, the third direction being substantially orthogonal to the fourth direction, the third and fourth directions being substantially parallel to the surface of the display.

17. The method of claim 13, wherein the at least one pointer device comprises two or more pointer devices, and determining a position of the least one pointer device comprises determining a position of each pointer device on the surface of the display.

18. The method of claim 13, wherein the at least one pointer device comprises at least one finger of a user.

19. The method of claim 13, wherein determining a position comprises determining a closest point to the at least one pointer device on the surface of the display.

20. The method of claim 13, wherein the threshold touch distance is less than about 1 inch.

21. The method of claim 13, further comprising determining that the first distance is less than a threshold detection distance and greater than the threshold touch distance and, in response thereto, providing an indication on the display that the position of the at least one pointer device has been determined, wherein providing the indication on the display comprises adjusting an image on the display in a vicinity of the position of the at least one pointer device on the surface of the display.

22. The method of claim 21, wherein the threshold detection distance is less than about 6 inches.

23. The method of claim 13, wherein taking an action indicative of contact between the at least one pointer device and the surface of the display comprises an action selected from the group consisting of: selecting an item, translating an image, expanding an image, shrinking an image, and rotating a virtual object.

24. The method of claim 13, wherein determining the first distance between the at least one pointer device and the surface of the display comprises calculating a scale factor based on the second distance between the at least one optical sensor and the at least one pointer device.

* * * * *